(No Model.)
F. ROUSSEL.
PHOTOGRAPHIC CAMERA.
No. 324,489. Patented Aug. 18, 1885.
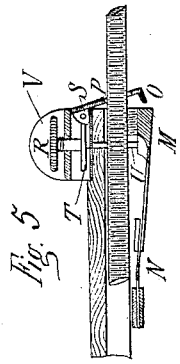
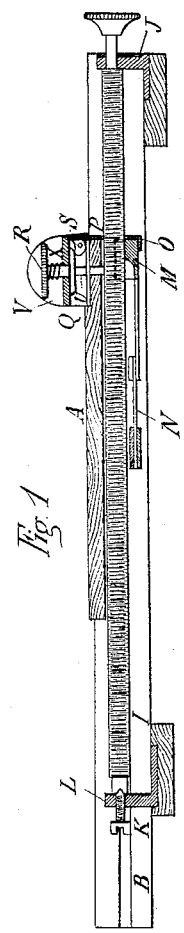
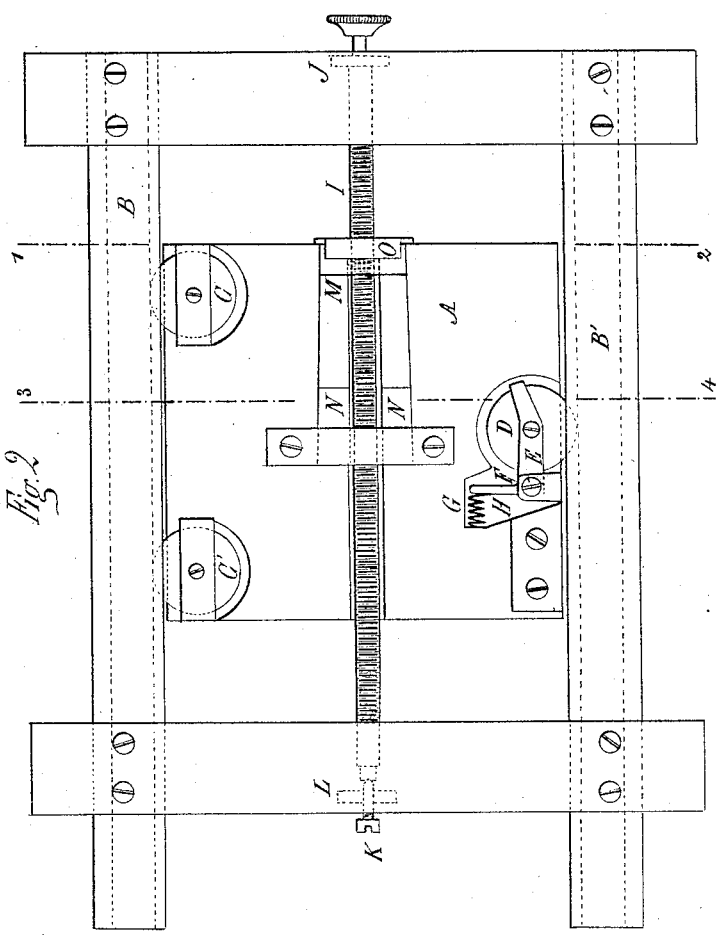
Inventor
François Roussel
per Lemuel W. Serrell
atty.
Witnesses
Chas H. Smith
Geo. T. Pinckney
N. PETERS, Photo-Lithographer, Washington, D.C.

UNITED STATES PATENT OFFICE.

FRANÇOIS ROUSSEL, OF VILLEFRANCHE, RHONE, FRANCE.

PHOTOGRAPHIC CAMERA.

SPECIFICATION forming part of Letters Patent No. 324,439, dated August 18, 1885.

Application filed June 5, 1885. (No model.) Patented in France February 21, 1885, No. 164,927.

*To all whom it may concern:*

Be it known that I, FRANÇOIS ROUSSEL, of Villefranche, in the Department of Rhone and Republic of France, have invented a new and useful Improvement in Photographic Cameras; and the following is declared to be a description of the same.

The object of the present invention, which relates to photographic apparatus, is to obtain instantaneously a perfect and immovable focus.

It is known that obtaining the focus consists in moving the glass or plate, on which the image should be produced with clearness, nearer to or farther from the object-glass or lens. This result is ordinarily obtained by securing the front of the camera carrying the lens on the table of the apparatus, while the rear part carrying the focusing-glass is secured to a slide operated, ordinarily, by a pinion turning in a fixed rack. With this arrangement the focusing is uncertain, on account of the necessary play between the teeth of the rack and the pinion. Furthermore, after the focus is obtained it is necessary to secure the slide firmly, to prevent it moving, and this is not always done at the exact point, and the desired position is frequently attained only after long and difficult trials.

My improvements relate specially to rapidly moving the back or sliding portion of the camera carrying the focusing-glass, which portion I have arranged upon a carriage, and to means for automatically and instantaneously securing it and holding it in a fixed position, which means I am going to describe, with the aid of the annexed drawings, in which I have represented the new part of the apparatus—that is to say, the frame of the table, in which moves the sliding carriage just spoken of.

In the drawings, Figure 1 is a longitudinal section. Fig. 2 is an inverted plan. Figs. 3 and 4 are transverse sections, at the lines 1 2 and 3 4, respectively, of Fig. 2. Fig. 5 is a view of the apparatus unlatched.

The same letters of reference designate the same parts in all the figures.

The sliding carriage A is operated between the sides B B' of the frame by the aid of three truncated rollers revolving in grooves of the same form cut in the sides B B'. The axis of two of these rollers, C C', are fixed on the carriage upon one side, while the third roller, D, which is on the opposite side, is mounted in a frame, E, pivoted at F. A spring, G, acting on an arm, H, of the frame E, tends to press the roller D against the side of the frame B', so as to avoid all play of the carriage, either lateral or vertical, and to neutralize the effects of wear and expansion or contraction, at the same time preserving an entire freedom of movement to the carriage; and these rollers are mounted upon pointed pivots, as shown in Figs. 3 and 4. A screw, I, traverses the frame and sliding carriage, and it is secured to the frame on one end by the support J, outside of which it carries a head by which said screw is operated, and the carriage moved back and forth in the frame B B', and on the other end it is supported by a pointed screw, K, tapped in a support, L, which prevents all longitudinal movement of the screw I. The screw I passes freely through the carriage in a groove sufficiently large, and the carriage is held to the screw I by a half-nut, M, carried by two spring-arms, N, which tend to press the nut on the screw, where it is maintained, ordinarily, by the flange o of a hinged latch, P, the function of which will be described hereinafter. In this position the sliding carriage is securely connected to the screw, the triangular threads of which cannot move in the nut supported by a spring and held by the flange o.

A special releasing device allows for disconnecting the carriage from the screw when it is desired to operate the carriage. This releasing device consists of a button, R, carried by a bridge, Q, on which is pivoted the latch P. The bridge is supported by the sliding carriage, and around the stem of the button, and between its head and the bridge there is a helical spring. The button R carries between the bridge Q a rectangular plate, T, resting upon two projections, s, forming part of the latch P. To this plate T are secured two small rods, U, which pass through holes in the carriage, and their lower ends are almost in contact with the half-nut M. If the button R is pressed upon, the plate T acts upon the heels S of the latch P, and moves said latch, so that the flange O is moved away from under the nut M. Then the rods U move the nut M away from contact with the screw I, and the carriage is completely disconnected from said screw. The button R is kept pressed down and away from the screw I while the carriage is being moved by hand in focusing, and when the desired position is obtained the button is released. The spring upon its stem at once forces up the button, releasing the nut M, which is forced by its spring N into contact with the screw I, and the flange O of the latch P takes under the nut M, and the carriage is thereby instantaneously secured by simply releasing the button R.

The foregoing operation is facilitated by two plates, V V, which are to be grasped by the thumb and middle finger while the first finger presses upon the button R.

The dimensions and details of arrangement of the apparatus will vary necessarily with those of the cameras to which this invention is applied. I reserve the right to modify them for each particular case without changing the principle of it.

I claim as my invention—

1. The combination, with the sliding carriage A and frame, of the screw I in bearings in the frame and passing beneath the carriage, the spring-arms N, and half-nut M, a latch to hold the half-nut against the screw, and a push-button and its stem, whereby the operation of the push-button releases the latch and forces the half-nut away from the screw I, so that the carriage A can be moved freely in focusing, substantially as specified.

2. The combination, with the sliding carriage A and frame and the adjusting-screw I, of the rollers C C' upon one side of the sliding carriage, the roller D upon the other side of the carriage, its frame E, arm H, and spring G, whereby the roller D is held against the frame by the spring, for the purposes and substantially as specified.

3. The combination, with the sliding carriage A and screw I, of the spring-arms N, half-nut M, button R, and stem U, bridge Q, plate T, pivoted latch P, and its flange O, substantially as specified.

The foregoing specification of my improvement in photographic cameras signed by me this 12th day of May, 1885.

FRANÇOIS ROUSSEL.

Witnesses:
JULES SEJINUTTI,
MARK PERYTEICOTTO.